United States Patent [19]

Avignon et al.

[11] Patent Number: 5,446,470

[45] Date of Patent: Aug. 29, 1995

[54] LOW-COST COMPACT MICROWAVE ANTENNA FOR A TRANSMITTER AND/OR RECEIVER SYSTEM MOUNTED IN A VEHICLE

[75] Inventors: Bruno Avignon, Palaiseau; Yves Canal, Antony, both of France

[73] Assignee: Thomson-CSF, Puteaux, France

[21] Appl. No.: 58,234

[22] Filed: May 10, 1993

[30] Foreign Application Priority Data

May 19, 1992 [FR] France ................ 92 06042

[51] Int. Cl.6 ............................ H01Q 1/32; H01Q 1/06
[52] U.S. Cl. .................................. 343/713; 343/712; 343/721
[58] Field of Search ............... 343/713, 720, 721, 711, 343/712, 872, 873; H01Q 1/32, 1/06; 362/253

[56] References Cited

U.S. PATENT DOCUMENTS

| | | | |
|---|---|---|---|
| 3,550,135 | 12/1970 | Bodmer | 343/840 |
| 3,683,379 | 8/1972 | Saddler et al. | 343/721 |
| 3,794,997 | 2/1974 | Iwatsuki et al. | 343/721 |
| 4,864,314 | 9/1989 | Bond | 343/700 MS |
| 5,313,213 | 5/1994 | Neumann et al. | 343/721 |

FOREIGN PATENT DOCUMENTS

| | | | |
|---|---|---|---|
| 120860 | 1/1946 | Australia | 343/721 |
| 2356130 | 2/1976 | France | |
| 2510265 | 7/1981 | France | |
| 8626907 | 3/1988 | Germany | |
| 4010242 | 10/1991 | Germany | |
| 1-232803 | 9/1989 | Japan | 343/721 |
| 612756 | 11/1948 | United Kingdom | 343/840 |

OTHER PUBLICATIONS

Hall, P. S., I.E.E. Proceedings, Microstrip Feeds for Prime Focus Fed Reflector Antennas, vol. 134, (1987), pp. 185-193.

N. Kumagai, Patent Abstracts of Japan, vol. 11, No. 313, (1987), p. 626.

Primary Examiner—Donald Hajec
Assistant Examiner—Hoanganh Le
Attorney, Agent, or Firm—Oblon, Spivak, McClelland, Maier, & Neustadt

[57] ABSTRACT

The antenna is produced by placing radiating elements (70) in at least one of the spaces occupied by the various vehicle external lights. The radiating elements can be dipoles formed by metallizing the lens (43) which closes the headlight casing (40) and the casing itself can be used to reflect the electromagnetic energy forwards.

24 Claims, 2 Drawing Sheets

LOW-COST COMPACT MICROWAVE ANTENNA FOR A TRANSMITTER AND/OR RECEIVER SYSTEM MOUNTED IN A VEHICLE

BACKGROUND OF THE INVENTION

This invention provides a low-cost, compact microwave antenna for a transmitter and/or receiver mounted in a vehicle fitted with external lights.

As a result of increased traffic density, particularly on roads, and the resultant increasing risk of collisions, many studies on anti-collision systems have been carried Out based, in particular, of the use of forward-looking radars on vehicles to detect obstacles. For the radar to "see" only the road in front of the vehicle, the width of the beam must be a few meters at roughly a 100 meters in front of the vehicle, i.e. a few degrees. Due to the limited space available for the antenna at the front of the vehicle, it was believed that frequencies of at least several tens of gigahertz were necessary to achieve the required antenna directivity.

However, problems can arise in constructing a radar operating at these relatively high frequencies.

Moreover, it has already been suggested that vehicles should include systems to exchange data and these would require microwave antennas at the front and rear of the vehicle.

In any event, it is known that manufacturers, particularly automobile manufacturers, are loath to change the shape and line of their vehicles which they have carefully designed to meet various aerodynamic, esthetic and dimensional criteria and to accommodate various components.

SUMMARY OF THE INVENTION

The invention provides a low-cost compact microwave antenna which requires no change to the vehicle bodywork but which, because it has a large apparent surface area, still allows operation at relatively low frequencies.

The invention also provides a microwave antenna which, by using space available in the vehicle external lights, eliminates any need for additional surface area for the antenna while still forming an antenna with an apparent area equal to the entire front or rear face of the vehicle.

Consequently, the invention provides a low-cost compact microwave antenna for an emitter and/or receiver system mounted in a vehicle fitted with external lights, these light units including a light reflector closed by a transparent lens and the antenna comprising at least one radiating element and reflector means, in which the said radiating elements are formed and placed in at least one of the spaces occupied by the said lights, at a certain distance from the focal point of the said light reflector.

Such a microwave antenna is particularly advantageous when used for anti-collision radars in automobile vehicles or any other type of vehicle with external lights. In addition, the invention is also particularly advantageous to produce low-cost road guidance radars and, for example, for radio links between vehicles.

BRIEF DESCRIPTION OF THE DRAWINGS

The invention will be better understood and other advantages will become clear upon reading the following description in association with the appended drawings of which.

DESCRIPTION OF THE PREFERRED EMBODIMENTS

An anti-collision radar system for an automobile will be used as an example to clarify the explanation.

Figure 1:
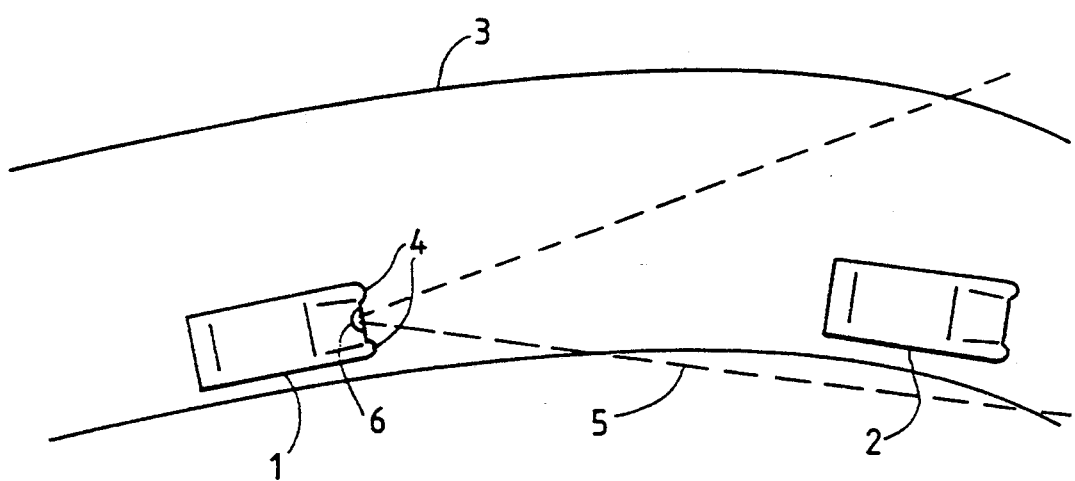
FIG. 1 is a diagram to illustrate the principle of an anti-collision system, of a known type, for road vehicles.

FIG. 1 shows two vehicles 1 and 2 following each other on road 3. It would be useful, for example in poor visibility, for the driver of one vehicle to obtain information on obstacles a short distance in front of his vehicle, particularly other vehicles, whether travelling or stopped. It has therefore been proposed to install a forward-looking radar, propagating a narrow beam (5 for vehicle 1 on FIG. 1) in each vehicle to detect obstacles. Such a radar system requires the installation of a microwave antenna 6 on the front of vehicle 1 to propagate beam 5. As has already being said, there is little space for this antenna and the radar would have to operate at frequencies of some tens of gigahertz to achieve the required directivity.

However, the front face of any automobile includes headlights 4 to illuminate the road by night and to make the vehicle visible by night or by day when visibility is poor. Similarly, the rear end carries tail lights and/or brake lights. Moreover, there are direction indicator lights both at the front and the rear. All these light units have an optical reflector (generally a metal or metallized parabola) and a lens in transparent material to enclose the space forward of the reflector.

The invention proposes to place microwave antennas in the space occupied by the said light units. These antennas, therefore, do not encroach on the front or rear face of the vehicle and are designed to minimize the attenuation of the light radiated by the lights.

If such an antenna is installed in each of both headlights (or more if there are more than two headlights and sidelights), they can be used either to form an array or sequentially.

In either case, the resultant apparent width of the antenna is similar to the width of the vehicle and, consequently, the required directivity can be obtained at considerably lower frequencies, for example a few gigahertz.

Figure 2:
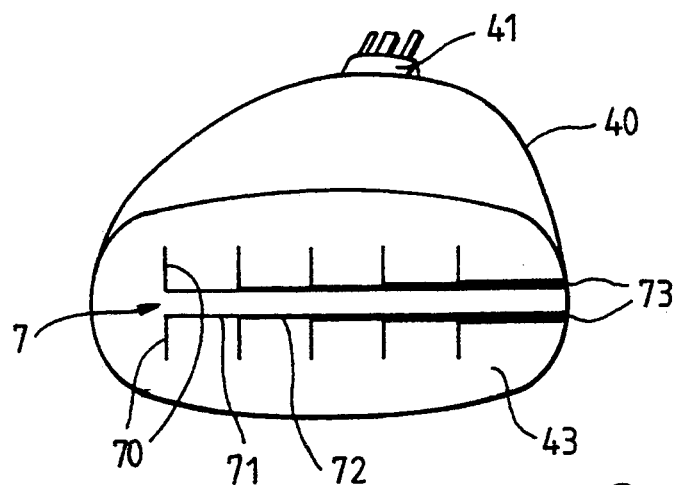
FIG. 2 is a diagram of an automobile headlight showing a first embodiment of the invention.

FIG. 2 illustrates one embodiment of the invention. Antenna 7 according to the invention comprises radiating elements consisting of dipoles, such as 70, formed on the lens 43 of a headlight whose casing 40 forms the, generally parabolic, optical reflector. The headlight includes a bulb 41 to provide the light energy in the conventional way.

The example represented includes five dipoles arranged in a linear network to form an antenna array. As in any conventional antenna array, the space between two adjacent radiating elements is selected to be less than or equal to half the operating wavelength. Power is fed to the dipoles via a 2-wire line connected to 2-wire input 73 and the antennas include sections 71 and 72, of differing width, to correctly distribute the power. The dipoles 70 and line 71, 72 can be produced by metallizing the internal or external surface of the lens 43 (which is, for example, in glass) using any metallization and etching technique known to the prior art. Clearly, the spacing and narrow width of the radiating elements ensure that their effect on the light transmitted by lens 43 is negligible. The microwave energy radiated rearwards within casing 40 is reflected forwards by reflector means which may be either the optical reflector itself or a special reflector, suitably placed in casing 40 and designed to interfere with the transmission of light energy as little as possible, as will be explained later. As can be seen, there is absolutely no need to place the radiating elements at the focus of the parabolic optical reflector 40, which reduces even further any interference with the operation of the headlight optical system.

Obviously, instead of a linear array, it is possible to form several parallel rows of dipoles to produce a dual-plane array.

Figure 3:
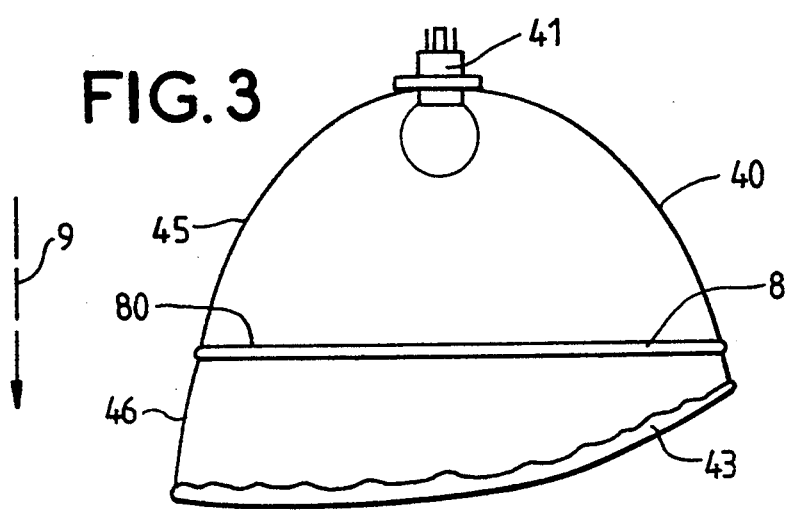
FIG. 3 illustrates another embodiment of the invention.

FIG. 3 represents another embodiment of the invention. It shows a headlight with a casing 40 which forms a parabolic optical reflector 45 extended by section 46. Casing 40 is closed by a transparent lens 43, for example in glass. A substrate 8, in transparent dielectric (for example glass but other materials are possible) is placed between parts 45 and 46. This substrate is positioned virtually perpendicular to the longitudinal axis 9 of the vehicle, although this is not mandatory.

The radiating elements are formed on the front face of the substrate and can be dipoles as in the embodiment illustrated by FIG. 2.

Figure 4:
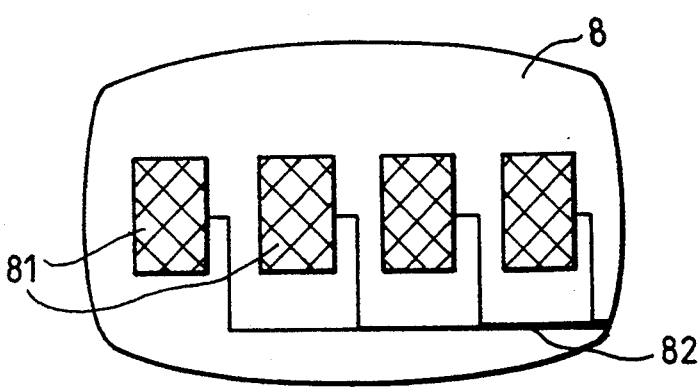
FIG. 4 is a front view of an element used in the embodiment illustrated by FIG. 3.

FIG. 4 is a front view on the substrate in the example chosen and illustrates the use of conductive patch radiating elements 81. The patches are associated with to a grounding plane 80 applied to the other face of the substrate (FIG. 3). The grounding plane 80 serves to reflect radio waves emitted by radiating elements 81. To ensure these radiating elements and the grounding plane have as little effect as possible on the transmission of light, they can consist, for example, of a conductive grid applied to the substrate by any method known to the prior art, for example by metallization or etching of a metallized film.

The patches are organized into an antenna array and the power is applied, preferably, by a microstrip line 82.

It is clear that these methods allow embodiment in headlights but also in any other external vehicle light (flashing indicator, tail lights, brake lights, etc.) and, if placed in each of the external lights, can form antenna arrays with an equivalent surface equal to that of the vehicle front or rear face. It is then possible to obtain sufficient directivity even at relatively low microwave frequencies.

However, it is also clear that, if it is required to operate at millimetric wavelengths, the radiating elements could cover a far smaller surface and could be connected to a special receiver which required only a very small area and, consequently, could be easily accommodated in front of the bulb in the light without interfering with its optical operation.

Although anti-collision radars have been used as an example for the description, such microwave antennas could also obviously be used for other purposes, for example for radio links.

Obviously, the embodiments described in no way limit the invention and many other embodiments of this invention are possible provided the antennas are placed in the space(s) occupied by the various lights on the vehicle.

What is claimed is:

1. A low-cost, compact microwave antenna for at least one of an emitter and receiver system mounted in a vehicle fitted with an external light, comprising:
    a casing which forms a light reflector closed by a transparent material lens
    at least one radiating element;
    a light bulb disposed at a focal point of the light reflector; and
    reflector means,
        wherein said at least one radiating element is positioned in the closed casing at a distance from the focal point of the light reflector.

2. A microwave antenna as claimed in claim 1, wherein said at least one radiating element are formed on the surface of said lens.

3. A microwave antenna as claimed in claim 2, wherein said at least one radiating element are formed by metallization of said surface.

4. A microwave antenna as claimed in claim 1, wherein said at least one radiating element are formed on a flat transparent dielectric substrate which is different from said lens and placed inside said light casing.

5. A microwave antenna as claimed in claim 4, wherein said at least one radiating element are formed by a metallization on at least one face of said substrate.

6. A microwave antenna as claimed in any one of claims 1 to 5, wherein said antenna reflector means is formed by said light reflector.

7. A microwave antenna as claimed in any one of claims 1 to 5, wherein said antenna reflector means is formed by a reflector which is different from the light reflector and placed inside said casing, further rearwards than said at least one radiating element relative to said lens.

8. A microwave antenna as claimed in claim 4 or 5, wherein said antenna reflector means includes a ground plane formed on a face of said substrate which is disposed away from said lens.

9. A microwave antenna as claimed in claim 8, wherein said substrate is placed within said casing in a plane perpendicular to the longitudinal axis of the vehicle.

10. A microwave antenna as claimed in claim 8 wherein said antenna reflector means is formed by a conductive grid which allows the light to pass.

11. A microwave antenna as claimed in any one of claims 2 to 5 wherein said at least one radiating element are dipoles forming an array.

12. A microwave antenna as claimed in claim 11, said dipoles are fed by 2-wire microwave lines formed on the surface which carries said dipoles.

13. A microwave antenna as claimed in any one of claims 2 to 5, wherein said at least one radiating element are patches which form an array.

14. A microwave antenna as claimed in claim 13, wherein power to said patches is fed by a microstrip line formed on a support which carries said patches.

15. A microwave antenna as claimed in claim 13, wherein said patches are formed by a conductive grid which allows light to pass.

16. A microwave antenna as claimed in claim 15, wherein said antenna reflector means is formed by a conductive grid which allows the light to pass.

17. A device for use in a motor vehicle, comprising:
    a lens made of a transparent material;
    a casing which is closed by said lens;
    a reflector having a focal point, said reflector disposed within said casing at an end of said casing opposite to the end at which the transparent lens is disposed;

a light bulb, disposed within said casing at the focal point of said reflector, for emitting light off of the reflector and through said lens to illuminate an area proximate to the motor vehicle; and an antenna mounted within said casing at a position which is a predetermined distance from the focal point of said reflector.

18. A device according to claim 17, wherein said light bulb is a light bulb of a motor vehicle headlight.

19. A device according to claim 17, wherein said light bulb is a light bulb mounted at a rear portion of the motor vehicle.

20. A device according to claim 17, wherein said antenna is a dipole antenna.

21. A device according to claim 17, wherein said antenna is mounted on an interior surface of said lens.

22. A device according to claim 17, wherein said antenna is a conductive grid.

23. A device according to claim 17, wherein said antenna is mounted on a transparent dielectric material which is different from said lens.

24. A device according to claim 17, wherein said casing mounts to an interior of said motor vehicle.

* * * * *